United States Patent Office 3,008,967
Patented Nov. 14, 1961

3,008,967
METHOD OF PREPARATION OF 1,4-DITHIA-2,3,5,6-TETRACYANOCYCLOHEXA-2,5-DIENE
Dale C. Blomstrom and William Channing Smith, Wilmington, Del., assignors to E. I. du Pont de Nemours and Company, Wilmington, Del., a corporation of Delaware
No Drawing. Filed Mar. 10, 1959, Ser. No. 798,333
7 Claims. (Cl. 260—327)

This invention relates to a new method of preparing the percyano cyclic sulfide having the formula

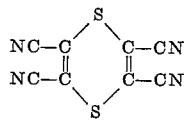

This compound can be called 1,4-dithia-2,3,5,6-tetracyanocyclohexa-2,5-diene. In accordance with the accepted nomenclature of heterocyclic compounds (see the Ring Index, by Patterson and Capell, 1940), it can also be called by the shorter name tetracyano-1,4-dithiin, which will be used hereinafter.

Ring-unsaturated percyano cyclic sulfides, i.e., ring-unsaturated cyclic sulfides in which the annular carbon atoms bear no hydrogen and are substituted solely by cyano groups, have been completely unknown until very recently. Such compounds have a unique structure. They are composed only of carbon, nitrogen and sulfur, and they possess a high degree of unsaturation, present as multiple conjugated systems formed by a plurality of cyano groups bonded to unsaturated ring carbon atoms.

Among such compounds, tetracyano-1,4-dithiin is of particular interest. This compound is described and claimed in copending application Serial No. 764,516, filed on October 1, 1958, by H. E. Simmons. It is also mentioned briefly in an article by G. Bähr, Angew. Chem., 70, 606 (1958). More efficient and economical methods of preparing tetracyano-1,4-dithiin than those heretofore described were desirable.

This invention provides a new and simple method of preparing tetracyano-1,4-dithiin in good yields, which comprises bringing in contact disodium dimercaptomaleonitrile, NaS—C(CN)=C(CN)—SNa, with a sulfur chloride in a substantially anhydrous, liquid reaction medium which is at least a partial solvent for the reactants and is essentially unreactive towards them, said medium being an organic compound free of active hydrogen.

The term "a sulfur chloride" as used herein includes sulfur monochloride, $S_2Cl_2$; sulfur dichloride, $SCl_2$; thionyl chloride, $SOCl_2$; and sulfuryl chloride, $SO_2Cl_2$. Binary sulfur chlorides, i.e., sulfur mono- and dichlorides, can be formed in situ from elemental sulfur and chlorine, and this reactant combination is fully operable in this process as the equivalent of a binary sulfur chloride.

The organic starting material in this process is disodium dimercaptomaleonitrile, which is also called 1,2-dicyano-1,2-disodiothioethylene. This compound has recently been described by Bähr and Schleitzer in Ber., 90, 438 (1957). It is a yellow crystalline solid, readily prepared by spontaneous coupling, with loss of sulfur, of sodium cyanodithioformate in water or chloroform solution. Sodium cyanodithioformate is itself prepared by reaction of sodium cyanide with carbon disulfide. The inorganic reactants are readily available and can be used as the commercial products without special purification provided they are substantially dry. The disodium dimercaptomaleonitrile also should preferably be used in an essentially anhydrous state.

The process can be represented by the following illustrative equations:

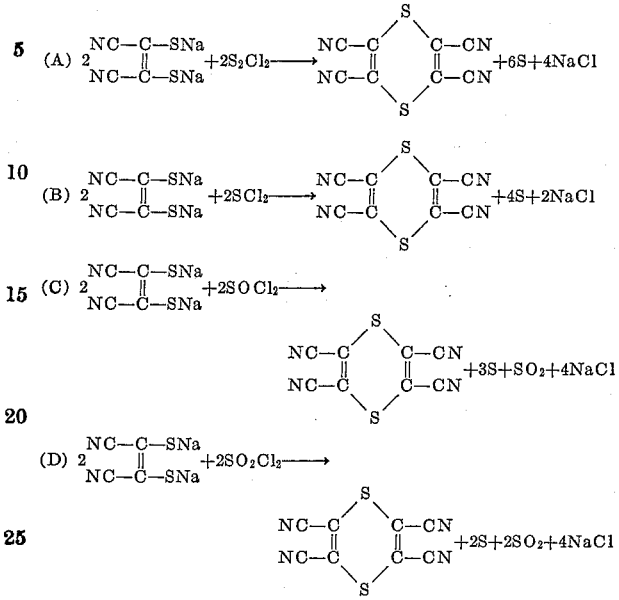

Although the reaction mechanism is not definitely known, it is believed that it involves two steps, in which an intermediate is first formed from two moles of disodium dimercaptomaleonitrile and one mole of sulfur chloride, then reacts with additional sulfur chloride to form tetracyano-1,4-dithiin. Whether or not this view is correct, it has been found experimentally that there should be used at least 0.5 mole of sulfur chloride per mole of disodium dimercaptomaleonitrile. Beyond this requirement, the proportions of the two reactants are not critical. In order to utilize completely the more expensive disodium dimercaptomaleonitrile and to facilitate the isolation of the product, it is preferred to use the two reactants in approximately equimolar amounts, or to use the inorganic reactant in slight to moderate excess thereover.

When sulfur and chlorine are used instead of a preformed binary sulfur chloride, the sulfur can be used in any amounts ranging from catalytic amounts, e.g., from 0.001 to 0.2 mole of sulfur per mole of disodium dimercaptomaleonitrile, to equivalent amounts, e.g., up to 2 moles of sulfur per mole of disodium dimercaptomaleonitrile. Very small amounts of sulfur are sufficient since sulfur is liberated during the reaction. In fact, since it is difficult to remove completely the sulfur formed on coupling of sodium cyanodithioformate to give disodium dimercaptomaleonitrile, the latter normally contains enough sulfur to make it unnecessary to add any more, so that the reaction proceeds simply on treatment of the disodium dimercaptomaleonitrile with chlorine. The chlorine is used in equimolar amounts with respect to the disodium dimercaptomaleonitrile, or in excess thereover.

The end point of the reaction is readily determined by the disappearance of the deep red color which develops initially when the reactants are brought in contact, and also by the fact that formation of sodium chloride ceases when all the disodium dimercaptomaleonitrile is used up.

As the reaction medium, or diluent, there may be used any substantially anhydrous, normally liquid (i.e., liquid between about —5 and 30° C.) organic material which dissolves the reactants to at least some extent and is substantially unreactive towards them under the reaction conditions. These requirements are met by organic liquid compounds consisting of carbon and hydrogen and at least one additional element, the latter being one or more of the elements oxygen, sulfur and nitrogen, no other elements being present, and the organic compound being moreover free of active hydrogen. Active hydrogen is defined here, as usual, as hydrogen detectable by the well known Zerewitinoff test. It can also be defined alternatively as hydrogen directly attached to oxygen, sulfur or nitrogen.

The reaction medium need only be able to dissolve the reactants to a very limited extent, which can be as low as 0.1% by weight at the operating temperature. It has been found that the reaction proceeds rapidly in diluents such as 1,2-dimethoxyethane or tetrahydrofuran whose solvent power for disodium dimercaptomaleonitrile is of this low order. Of course, no harm results if the reaction medium is a much better solvent. The sulfur chloride (or sulfur and chlorine, as the case may be) also need be dissolved only to the extent of 0.1% by weight, although normally the sulfur chloride is much more soluble in most media than disodium dimercaptomaleonitrile. The reaction medium need not be a solvent for the tetracyano-1,4-dithiin, although, when it is a solvent, working up of the reaction product is facilitated.

The reaction media as defined above are substantially inert towards disodium dimercaptomaleonitrile, being halogen-free and free of active hydrogen. Inertness towards the sulfur chloride can be easily recognized by the absence of heat evolution, gas evolution or color development when the diluent to be used and the sulfur chloride are mixed at the operating temperature. Obviously, it is not necessary that the reaction medium be totally unreactive towards the sulfur chloride. It is only necessary that there be a substantial difference between the reaction rates of the sulfur chloride with the disodium dimercaptomaleonitrile, on the one hand, and with the diluent on the other hand.

Suitable reaction media include acyclic or cyclic ethers such as di-n-butyl ether, 1,2-dimethoxyethane, 1,2-diethoxyethane, tetrahydrofuran, dioxane, anisole, etc.; carboxylic acid esters such as methyl acetate, ethyl acetate, n-octyl acetate, methyl butyrate, ethyl benzoate, etc.; nitriles such as acetonitrile, propionitrile, butyronitrile, adiponitrile, benzonitrile, etc.; tertiary amines such as triethylamine, pyridine, N,N-diethylaniline, etc.; nitro and nitroso compounds such as nitromethane, nitroethane, nitrobenzene, p-nitrotoluene, methyl p-nitrobenzoate, N-nitrosodimethylamine, etc.; carboxylic acid amides such as N,N-dimethylformamide, N,N-dimethylacetamide, tetramethylurea, etc.; sulfides, sulfoxides and sulfones such as diethyl sulfide, di-n-butyl sulfide, dimethyl sulfoxide, diethyl sulfoxide, tetramethylene cyclic sulfone, etc.; and the like. For reasons of economy and ease of handling, the preferred reaction media are those, defined as above, which contain from one to ten carbon atoms. Particularly good results are obtained with aliphatic diethers and with cyclic ethers, and reaction media belonging to these classes are therefore especially preferred.

The amount of liquid diluent is immaterial provided it is sufficient to form a liquid phase, that is, to maintain the disodium dimercaptomaleonitrile and the inorganic products which form during the reaction in suspension. In practice, there is desirably used a weight of diluent equal to 2–20 times the weight of disodium dimercaptomaleonitrile.

The reaction is exothermic and does not require the application of external heat. It can take place at temperatures as low as −50° C. with a reaction medium which is liquid at such temperatures. For convenience, the reaction is generally conducted so that the internal temperature is at or near room temperature, e.g., between 0 and 50° C. However, moderate heating, e.g., up to 150° C., can be used if desired, especially near the end of the reaction, to promote complete utilization of the disodium dimercaptomaleonitrile.

The reaction is most conveniently carried out at atmospheric pressure by adding the sulfur chloride, if desired as a solution in the reaction medium used, gradually or all at once to the liquid reaction medium containing the disodium dimercaptomaleonitrile in suspension or partial solution. Alternatively, the reactants can be placed in a cold pressure vessel which is then sealed and the reaction is allowed to proceed at ambient or higher temperature under the autogenous pressure developed by the reactants and reaction products. In either case, stirring is beneficial, though not essential.

Tetracyano-1,4-dithiin is conveniently isolated by filtering off the inorganic reaction products and evaporating the reaction medium, when it is soluble in the latter, or precipitating it therefrom by addition of a non-solvent. If tetracyano-1,4-dithiin is not appreciably soluble in the reaction medium, it can be recovered by extracting the total solid reaction product with a suitable solvent. It can be purified, if necessary, by conventional methods such as recrystallization, selective absorption on solid absorbents, or the like.

The invention is illustrated in greater detail by the following examples, in which parts are by weight.

Example I

To a stirred suspension of 3 parts of disodium dimercaptomaleonitrile in 25 parts of 1,2-dimethoxyethane a 0° C. was added over a 40-minute period a solution of 1.92 parts of thionyl chloride in 4 parts of 1,2-dimethoxyethane. The wine-red color which developed during the reaction faded rapidly near the end of the addition, leaving a pale yellow suspension. This suspension was filtered free of sodium chloride and sulfur, and the filtrate was diluted with 70 parts of petroleum ether. There was thus obtained 1.8 parts (100% yield) of tetracyano-1,4-dithiin as a tan precipitate. It was recrystallized twice from toluene to give the pure product as bright yellow needles, M.P. 207–209° C.

*Analysis.*—Calc'd for $C_8N_4S_2$: C, 44.43; N, 25.91; S, 29.66. Found: C, 44.63; N, 25.89; S, 29.96.

When this example was repeated, except that the reaction medium was tetrahydrofuran rather than dimethoxyethane, there was obtained an 87% yield of tetracyano-1,4-dithiin. Another suitable diluent is cyclic tetramethylene sulfone, used at a slightly higher temperature (25–30° C.) where it is a liquid.

Example II

Using the procedure and diluent of Example I, 3 parts of disodium dimercaptomaleonitrile was reacted with 2.18 parts of sulfuryl chloride. There was obtained 1.03 parts (59% yield) of tetracyano-1,4-dithiin.

The dimethoxyethane used in this example can be replaced by ethyl acetate or acetonitrile with similar results.

Example III

To a suspension of 3 parts of disodium dimercaptomaleonitrile in 25 parts of 1,2-dimethoxyethane stirred at 0° C. was added gradually a solution of 2.20 parts of sulfur monochloride in 4 parts of 1,2-dimethoxyethane. When the addition was complete (40 minutes), the yellow suspension was filtered and 70 parts of petroleum ether was added to the filtrate. There was obtained 1.23 parts (71% yield) of tetracyano-1,4-dithiin, M.P. 207° C. after recrystallization from toluene.

Similar results are obtained by substituting N,N-dimethylformamide or nitromethane for dimethoxyethane in this example.

Example IV

Using the procedure and diluent of Example III, 3 parts of disodium dimercaptomaleonitrile was reacted with 1.66 parts of sulfur dichloride. There was obtained 1.33 parts (76% yield) of tetracyano-1,4-dithiin.

Example V

A suspension of 0.1 part of sulfur in 25 parts of 1,2- dimethoxyethane was stirred at 0° C. for 10 minutes with a slow stream of dry chlorine passing into the suspension. Three parts of disodium dimercaptomaleonitrile was then added all at once. The addition of chlorine was continued for about 1.5 hours until the deep red color of the reaction mixture had faded to yellow. The mixture was filtered and the filtrate was diluted with petroleum ether. The buff-colored tetracyano-1,4-dithiin which precipitated amounted to 1.40 parts (80% yield). It melted at 208–209° C. without purification.

Similar results are obtained by using pyridine or tetramethylurea as the diluent.

*Example VI*

This example illustrates the reaction of chlorine with disodium dimercaptomaleonitrile without added sulfur, the only sulfur in the system being the traces normally present as impurities in the disodium dimercaptomaleonitrile, plus the sulfur formed during the course of the reaction.

A slow stream of dry chlorine was passed through a stirred suspension of 3 parts of disodium dimercaptomaleonitrile in 25 parts of 1,2-dimethoxyethane at 0° C. The color changes during the reaction were the same as in the preceding examples. When the red color had disappeared, the reaction mixture was filtered and the filtrate was diluted with petroleum ether. This treatment precipitated 0.85 part (49% yield) of somewhat impure tetracyano-1,4-dithiin as a brown solid.

Tetracyano-1,4-dithiin is useful as intermediate in the preparation of a number of technically valuable products. For example, it is capable of reacting with aromatic or heterocyclic amines or azomethines to give dyes. This is exemplified by the condensation of tetracyano-1,4-dithiin in dimethyl sulfoxide or dimethyl formamide solution with the N,N-dimethylhydrazone of furfural or of pyrrol-2-carboxaldehyde to give solid materials, red or magenta in color, which absorb strongly in the visible spectrum with maximum absorption at about 500 millimicrons. These products are effective in the dyeing of textile materials when applied from neutral or slightly basic media. By reaction with cuprous chloride in 1,2,4-trichlorobenzene at 190° C., tetracyano-1,4-dithiin gives an intensely colored, dark green solid whose spectral characteristics indicates it to be a novel type of percyano copper phthalocyanine, useful as a pigment in the same manner as the known phthalocyanines.

In the presence of moist alkali, tetracyano-1,4-dithiin slowly decomposes with evolution of hydrogen cyanide. Thus, when deposited from alkaline suspension, e.g., by spraying, on living plants or on insect nests, it acts as an effective insect poison for extended periods of time, or it can be used in fumigation treatments.

Since obvious modifications in the invention will be evident to those skilled in the chemical arts, we propose to be bound solely by the appended claims.

The embodiments of the invention in which an exclusive property or privilege is claimed are defined as follows:

1. The process of preparing tetracyano-1,4-dithiin which comprises reacting dry chlorine, sulfur and disodium dimercaptomaleonitrile in liquid 1,2-dimethoxyethane, the mole ratio of chlorine to disodium dimercaptomaleonitrile being at least 1:1.

2. The process of preparing tetracyano-1,4-dithiin which comprises reacting disodium dimercaptomaleonitrile, under substantially anhydrous conditions, with at least one member of the group consisting of sulfur monochloride, sulfur dichloride, thionyl chloride, sulfuryl chloride and a combination of elemental sulfur and chlorine in a liquid organic reaction medium consisting of carbon, hydrogen and at least one of the elements oxygen, sulfur and nitrogen, said compound being free of Zerewitinoff active hydrogen and being selected from the group consisting of ethers, carboxylic acid esters, nitriles, tertiary amines, nitro and nitroso compounds, carboxylic acid amides, sulfides, sulfoxides, and sulfones, the quantities of reactants being such that, when a compound containing sulfur and chlorine is employed, the mole ratio of said compound to disodium dimercaptomaleonitrile is at least 0.5:1, and, when a combination of elemental sulfur and chlorine is used, the mole ratio of chlorine to disodium dimercaptomaleonitrile is at least 1:1.

3. The process of preparing tetracyano-1,4-dithiin which comprises reacting disodium dimercaptomaleonitrile, under substantially anhydrous conditions, with at least one member of the group consisting of sulfur monochloride, sulfur dichloride, thionyl chloride, sulfuryl chloride and a combination of elemental sulfur and chlorine in a liquid aliphatic diether, the quantities of reactants being such that, when a compound containing sulfur and chlorine is employed, the mole ratio of said compound to disodium dimercaptomaleonitrile is at least 0.5:1, and, when a combination of elemental sulfur and chlorine is used, the mole ratio of chlorine to disodium dimercaptomaleonitrile is at least 1:1.

4. The process of claim 3 wherein the liquid aliphatic diether is 1,2-dimethoxyethane.

5. The process of preparing tetracyano-1,4-dithiin which comprises reacting disodium dimercaptomaleonitrile, under substantially anhydrous conditions, with at least one member of the group consisting of sulfur monochloride, sulfur dichloride, thionyl chloride, sulfuryl chloride and a combination of elemental sulffur and chlorine in a liquid cyclic ether, the quantities of reactants being such that, when a compound containing sulfur and chlorine is employed, the mole ratio of said compound to disodium dimercaptomaleonitrile is at least 0.5:1, and, when a combination of elemental sulfur and chlorine is used, the mole ratio of chlorine to disodium dimercaptomaleonitrile is at least 1:1.

6. The process of claim 5 wherein the liquid cyclic ether is tetrahydrofuran.

7. The process of preparing tetracyano-1,4-dithiin which comprises reacting dry chlorine, sulfur and disodium dimercaptomaleonitrile in a liquid organic compound consisting of carbon, hydrogen and at least one of the elements oxygen, sulfur and nitrogen, said compound being free of Zerewitinoff active hydrogen and being selected from the group consisting of ethers, carboxylic acid esters, nitriles, tertiary amines, nitro and nitroso compounds, carboxylic acid amides, sulfides, sulfoxides, and sulfones, the mole ratio of chlorine to disodium dimercaptomaleonitrile being at least 1:1.

No references cited.